(12) United States Patent
Ikeda et al.

(10) Patent No.: US 9,995,983 B2
(45) Date of Patent: Jun. 12, 2018

(54) LIQUID CRYSTAL DEVICE

(71) Applicant: Japan Display Inc., Minato-ku (JP)

(72) Inventors: Kojiro Ikeda, Tokyo (JP); Masaaki Kabe, Tokyo (JP); Shinichiro Oka, Tokyo (JP); Akira Sakaigawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/365,245

(22) Filed: Nov. 30, 2016

(65) Prior Publication Data

US 2017/0160571 A1    Jun. 8, 2017

(30) Foreign Application Priority Data

Dec. 2, 2015    (JP) .................. 2015-235743

(51) Int. Cl.
  *G02F 1/137*    (2006.01)
  *G02F 1/1337*   (2006.01)
  *G02F 1/1335*   (2006.01)
  *G02F 1/1343*   (2006.01)

(52) U.S. Cl.
  CPC .......... *G02F 1/137* (2013.01); *G02F 1/13439* (2013.01); *G02F 1/133553* (2013.01); *G02F 1/133707* (2013.01); *G02F 1/134309* (2013.01); *G02F 1/134363* (2013.01); *G02F 2001/13756* (2013.01)

(58) Field of Classification Search
  None
  See application file for complete search history.

(56) References Cited

U.S. PATENT DOCUMENTS

| 2003/0128315 | A1* | 7/2003 | Tashiro ............. G02F 1/133553 349/113 |
| 2005/0083479 | A1* | 4/2005 | Okumura .......... G02F 1/133555 349/178 |
| 2005/0128402 | A1  | 6/2005 | Lee |
| 2005/0270449 | A1* | 12/2005 | Koma ............... G02F 1/133371 349/114 |
| 2009/0174853 | A1  | 7/2009 | Stromer et al. |
| 2009/0195717 | A1  | 8/2009 | Kabe et al. |

FOREIGN PATENT DOCUMENTS

| JP | 2009-181066 | 8/2009 |
| JP | 2012-118144 | 6/2012 |

* cited by examiner

*Primary Examiner* — Ashok Patel
(74) *Attorney, Agent, or Firm* — Oblon, McClelland, Maier & Neustadt, L.L.P.

(57) ABSTRACT

According to one embodiment, a liquid crystal device includes a first substrate including a first electrode and a second electrode opposed to the first electrode, a second substrate opposed to the first substrate, and a liquid crystal layer including liquid crystal molecules held between the first substrate and the second substrate, wherein the second electrode is positioned closer to the liquid crystal layer than is the first electrode and has a polygonal-shaped first opening including at least one projection, and the liquid crystal layer indicates transparency when no voltage is applied thereto and indicates scattering when a voltage is applied thereto.

15 Claims, 15 Drawing Sheets

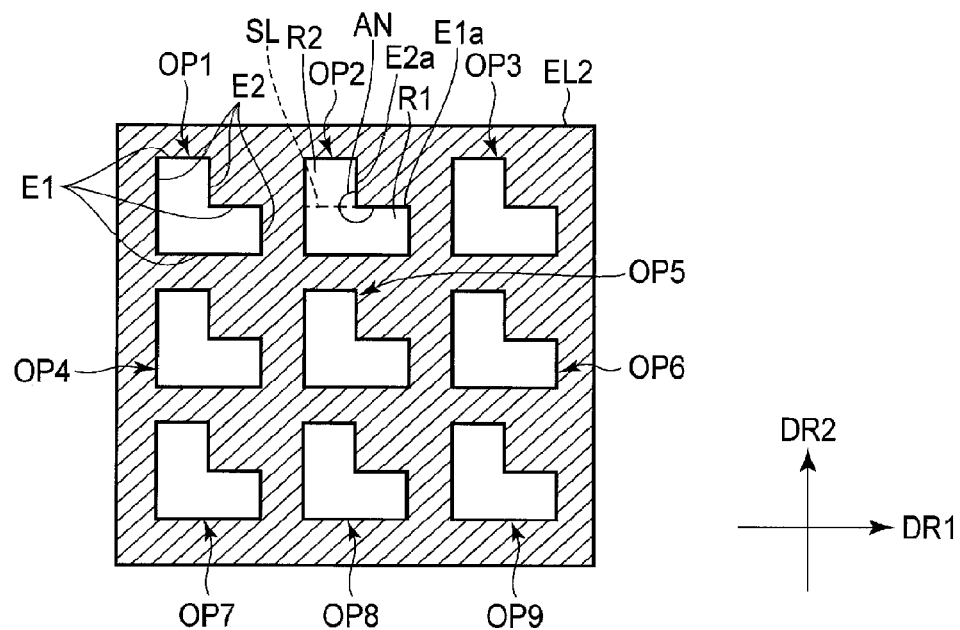
F I G. 4
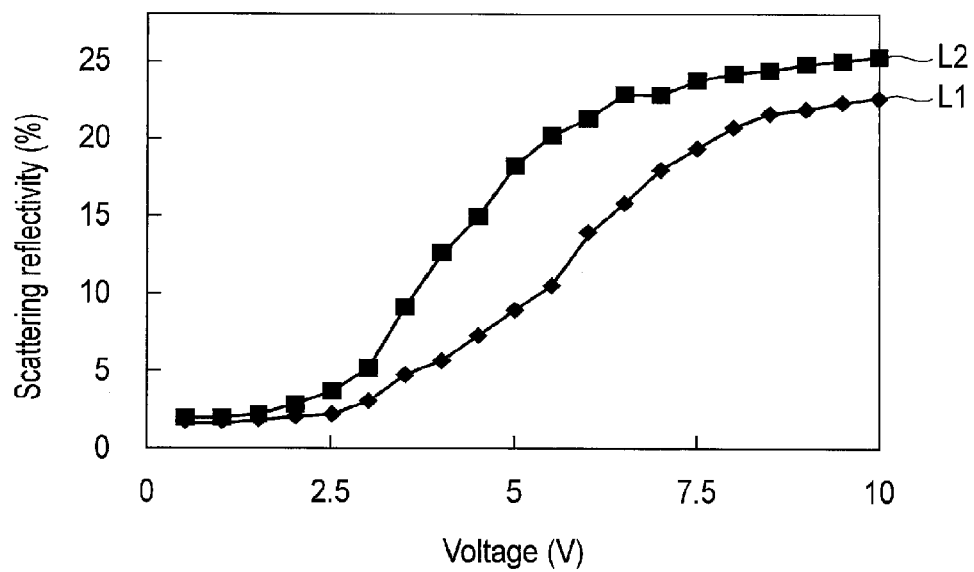
F I G. 5

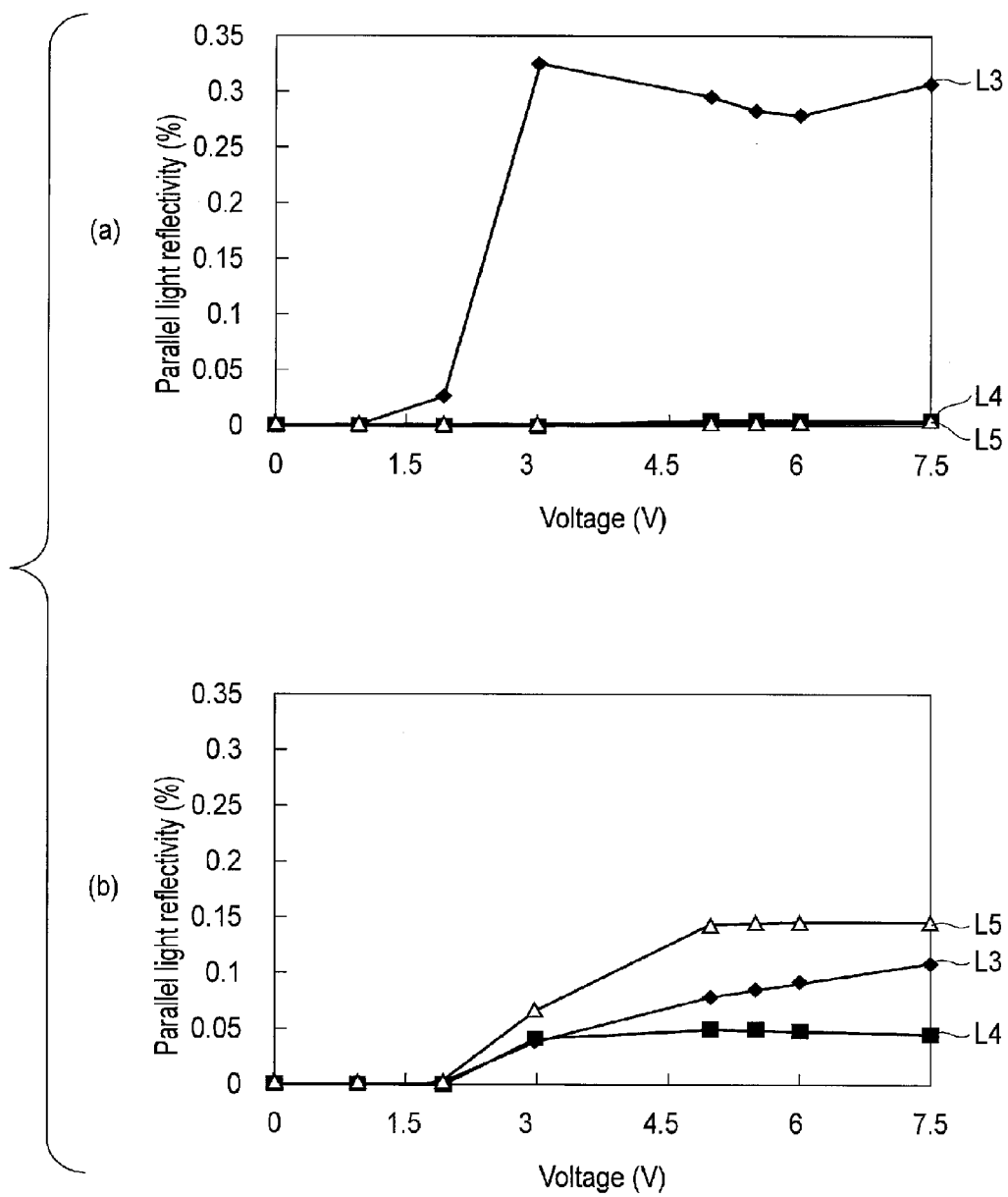
F I G. 6

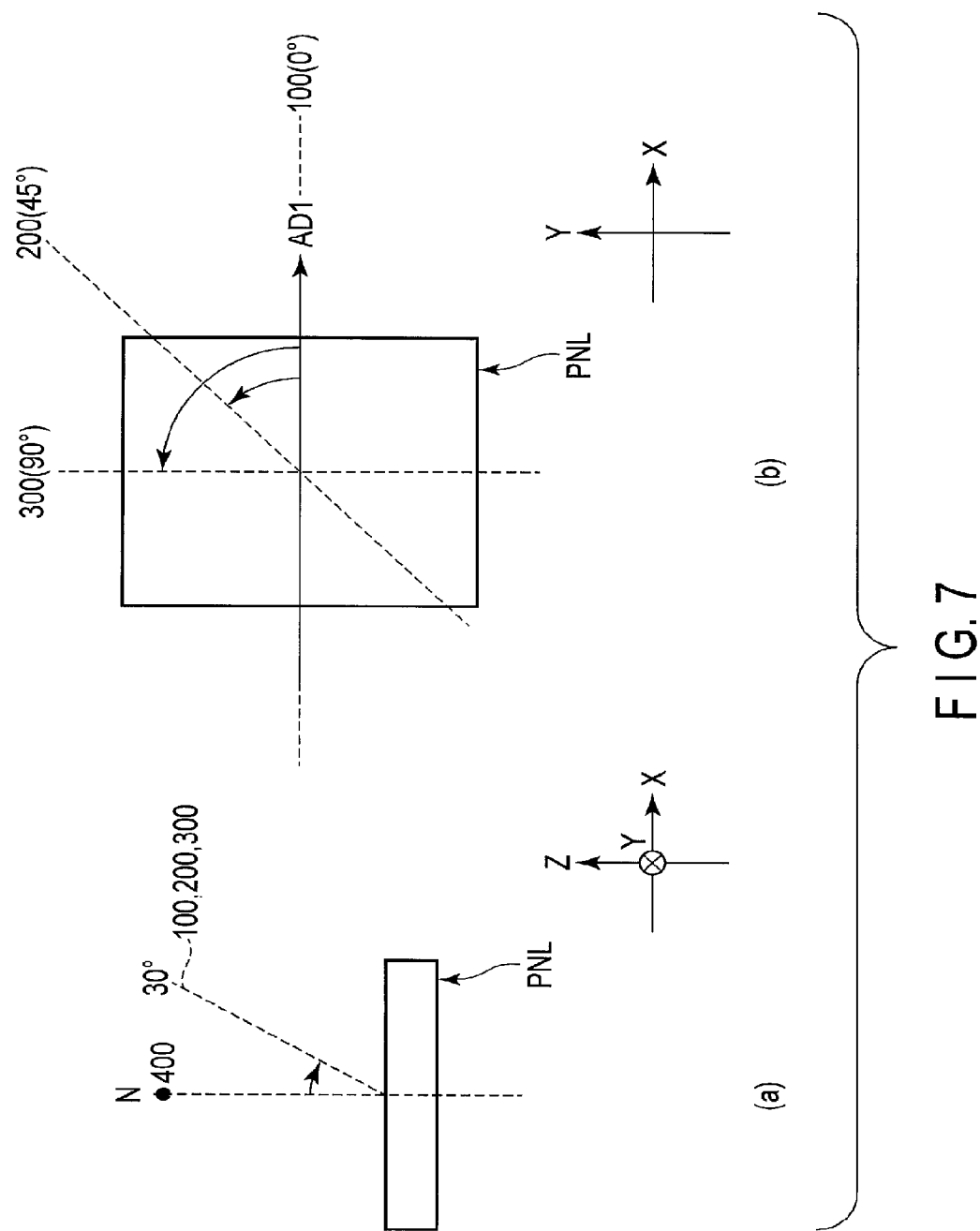
F I G. 7

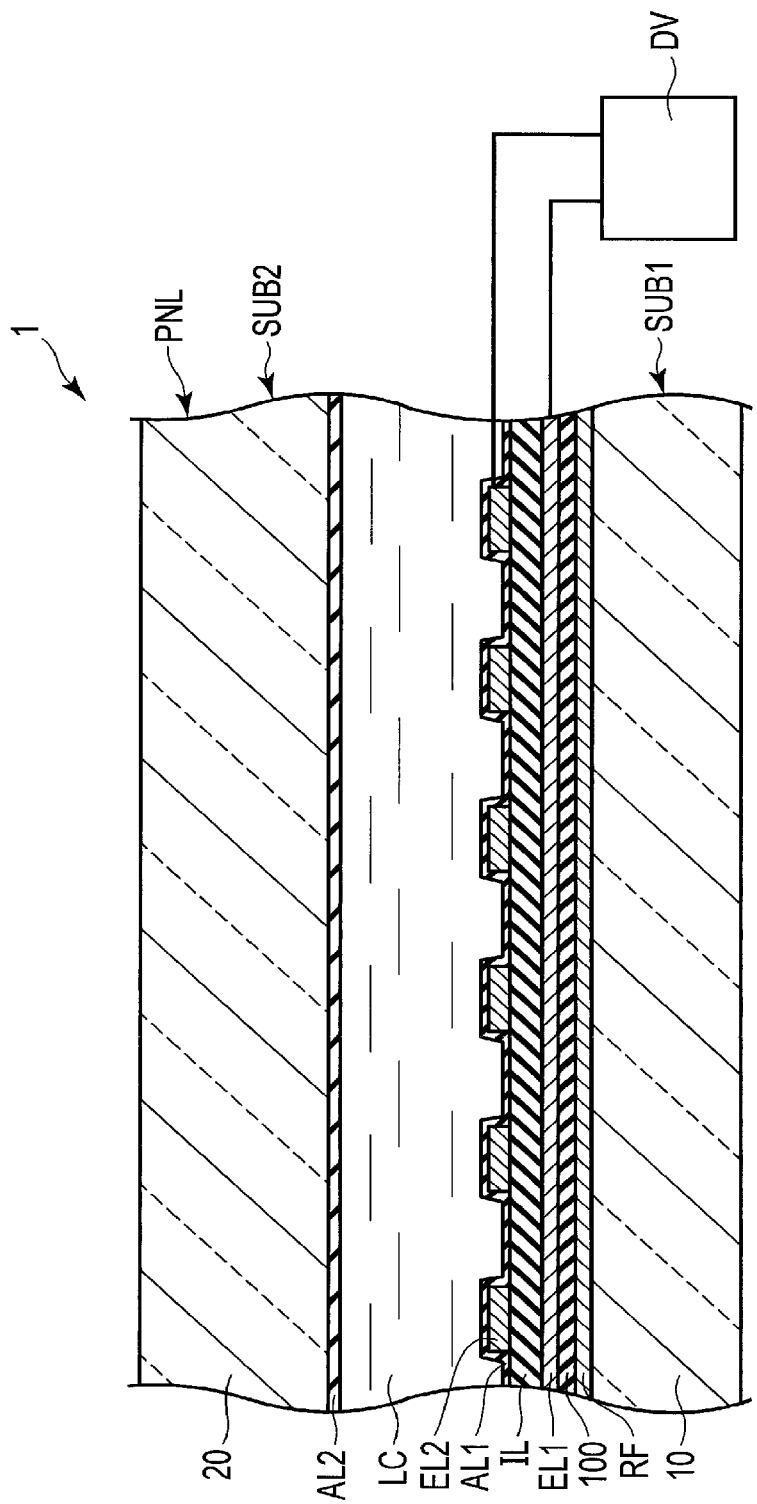
F I G. 14

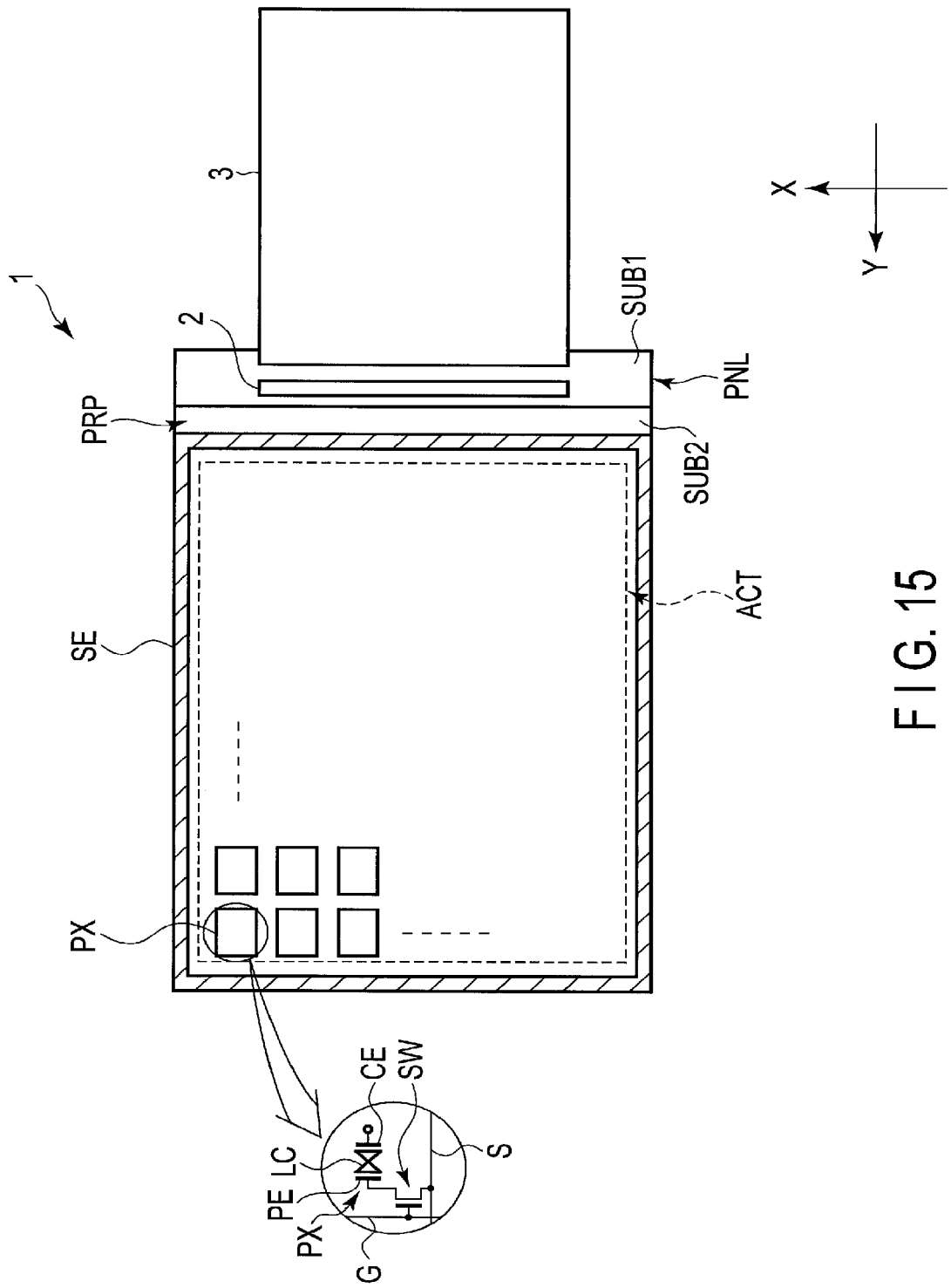
F I G. 15

LIQUID CRYSTAL DEVICE

CROSS-REFERENCE TO RELATED APPLICATIONS

This application is based upon and claims the benefit of priority from Japanese Patent Application No. 2015-235743, filed Dec. 2, 2015, the entire contents of which are incorporated herein by reference.

FIELD

Embodiments described herein relate generally to a liquid crystal device.

BACKGROUND

In recent years, liquid crystal devices of scattering type which use a horizontal field to be driven with a low voltage are proposed. Such a liquid crystal device of scattering type includes, for example, a liquid crystal layer held between a pair of substrates, and electrodes which produce a horizontal field on the liquid crystal layer to be parallel to the substrates, in which the liquid crystal layer indicates a light transmissive state when a horizontal field is not formed and indicates a light scattering state when a horizontal field is formed. Such a liquid crystal device of scattering type does not require a polarizer, and thus, display can be achieved brighter as compared to a case where a liquid crystal device includes a polarizer.

BRIEF DESCRIPTION OF THE DRAWINGS

FIG. 4 is a plan view showing an example of the structure of a second electrode EL2 of the liquid crystal device 1 of the embodiment.

FIG. 5 shows a relationship between a voltage (V) and scattering reflectivity of each of the liquid crystal device 1 including rectangular openings as shown in FIG. 2 and the liquid crystal device 1 including polygonal openings with projections as shown in FIG. 4.

FIG. 6 shows a relationship between a voltage (V) and parallel light reflectivity measured when parallel light is incident from three incident points 100, 200, and 300 on each of the liquid crystal device 1 of the example of FIG. 2 and the liquid crystal device 1 including the second electrode EL2 as in FIG. 4.

FIG. 7 shows a positional relationship of the incident points 100, 200, and 300.

FIG. 14 is a cross-sectional view of a variation of the liquid crystal device 1 of the embodiment.

FIG. 15 is a plan view showing an example in which the liquid crystal device 1 of the embodiment is used in a display device.

DETAILED DESCRIPTION

Figure 1:
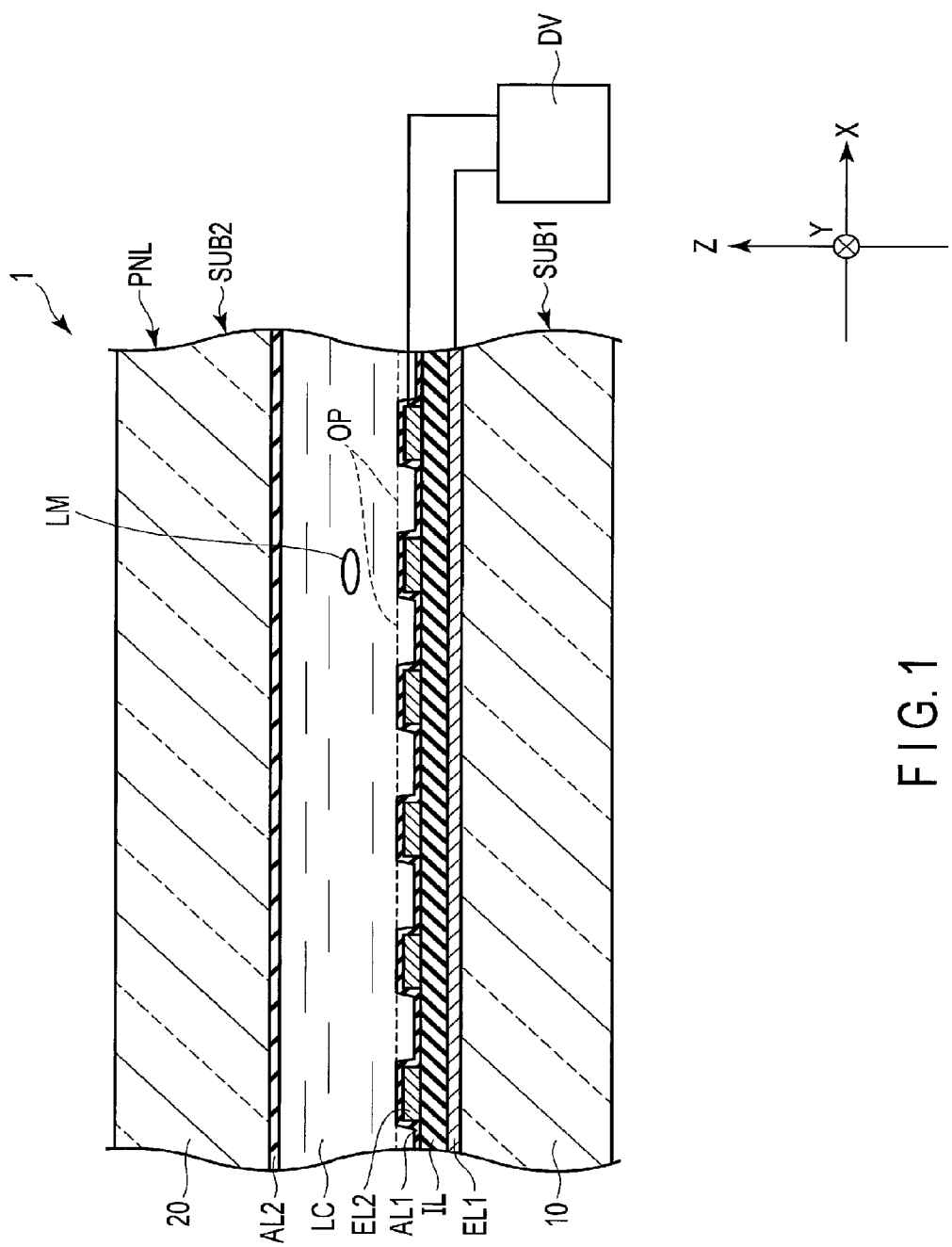
FIG. 1 is a cross-sectional view of the structure of a liquid crystal device 1 of an embodiment.

In general, according to one embodiment, a liquid crystal device includes a first substrate including a first electrode and a second electrode opposed to the first electrode, a second substrate opposed to the first substrate, and a liquid crystal layer including liquid crystal molecules held between the first substrate and the second substrate, wherein the second electrode is positioned closer to the liquid crystal layer than is the first electrode and has a polygonal-shaped first opening including at least one projection, and the liquid crystal layer indicates transparency when no voltage is applied thereto and indicates scattering when a voltage is applied thereto.

According to one embodiment, a liquid crystal device includes a first substrate including a first electrode and a second electrode opposed to the first electrode, a second substrate opposed to the first substrate; and a liquid crystal layer including liquid crystal molecules held between the first substrate and the second substrate, wherein the second electrode is positioned closer to the liquid crystal layer than is the first electrode and has a polygonal-shaped first opening including a plurality of projections projecting in the same direction, and the liquid crystal layer indicates transparency when no voltage is applied thereto and indicates scattering when a voltage is applied thereto.

Embodiments will be described hereinafter with reference to the accompanying drawings. The disclosure is merely an example, and changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. The schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless necessary.

Firstly, a liquid crystal device of an embodiment will be described.

FIG. 1 is a cross-sectional view of the structure of a liquid crystal device 1 of the present embodiment.

A liquid crystal display panel PNL includes a first substrate SUB1, second substrate SUB2, and liquid crystal layer LC. The second substrate SUB2 is opposed to the first substrate SUB1. The liquid crystal layer LC is held between the first substrate SUB1 and the second substrate SUB2 to accommodate liquid crystal molecules LM.

In the figure depicted, a first direction X and a second direction Y are orthogonal to each other, and a third direction Z is orthogonal to both the first direction X and the second direction Y. The direction of extension of the third direction Z, or the direction from the first substrate SUB1 to the second substrate SUB2 is defined as above or upward, and the opposite direction of the direction of extension of the third direction Z, or the direction from the second substrate SUB2 to the first substrate SUB1 is defined as below or downward.

The first substrate SUB1 includes a first insulating substrate 10, first electrode EL1, interlayer insulating film IL, second electrode EL2, and first alignment film AL1.

The first insulating substrate 10 is a light transmissive substrate such as a glass substrate or a resin substrate.

The first electrode EL1 is formed on the first insulating substrate 10. The first electrode EL1 is a transparent conductive layer which is formed of a transparent conductive material such as indium tin oxide (ITO) or indium zinc oxide (IZO).

The interlayer insulating film IL is formed on the first electrode EL1. The interlayer insulating film IL is formed of an inorganic material such as silicon oxide or silicon nitride.

The second electrode EL2 is formed on the interlayer insulating film IL. The second electrode EL2 includes openings OP depicted by dotted lines in the figure. The second electrode EL2 is opposed to the first electrode EL1 and is positioned closer to the liquid crystal layer LC than is the first electrode EL1. The second electrode EL2 is a transparent conductive layer which is formed of a transparent conductive material such as ITO or IZO.

The first alignment film AL1 covers the second electrode EL2 and contacts the interlayer insulating film IL through the openings OP.

The second substrate SUB2 includes a second insulating substrate 20 and a second alignment film AL2. The second insulating substrate 20 is a light transmissive substrate such as a glass substrate or a resin substrate. The second alignment film AL2 covers the second insulating substrate 20.

A driver DV is electrically connected to the first electrode EL1 and the second electrode EL2 to apply a voltage thereto. The liquid crystal display panel PNL of the present embodiment includes both the first electrode EL1 and the second electrode EL2 in the first substrate SUB1. When a voltage is applied to the first electrode EL1 and the second electrode EL2 from the driver DV, a horizontal field is produced along the main surfaces of the substrates between the first and second electrodes EL1 and EL2. Note that the main surfaces of the substrates are parallel to the X-Y plane which is defined by the first direction X and the second direction Y.

The liquid crystal display panel PNL passes the light from the lower surface of the first substrate SUB1 to the upper surface of the second substrate SUB2 and the light from the upper surface of the second substrate SUB2 to the lower surface of the first substrate SUB1 in a no-voltage applied state where no voltage is applied to the first electrode EL1 or the second electrode EL2, for example. Furthermore, the liquid crystal display panel PNL scatters the light from the lower surface of the first substrate SUB1 to the upper surface of the second substrate SUB2 and scatters the light from the upper surface of the second substrate SUB2 to the lower surface of the first substrate SUB1 in a voltage applied state where a voltage is applied to the first electrode EL1 and the second electrode EL2.

Note that, as described later, the liquid crystal display panel PNL may include a reflective layer. In the example of FIG. 1, the first electrode EL1 is formed as a reflective layer and the second electrode EL2 is a transparent conductive layer. In that case, the first electrode EL1 is formed of a highly reflective metal material such as aluminum or silver. With the first electrode EL1 formed as a reflective layer, an additional reflective layer is not required, and the manufacturing process can be simplified.

As depicted, the liquid crystal device 1 of the present embodiment does not include a polarizer in any of the lower surface of the first substrate SUB1 or the upper surface of the second substrate SUB2.

Figure 2:
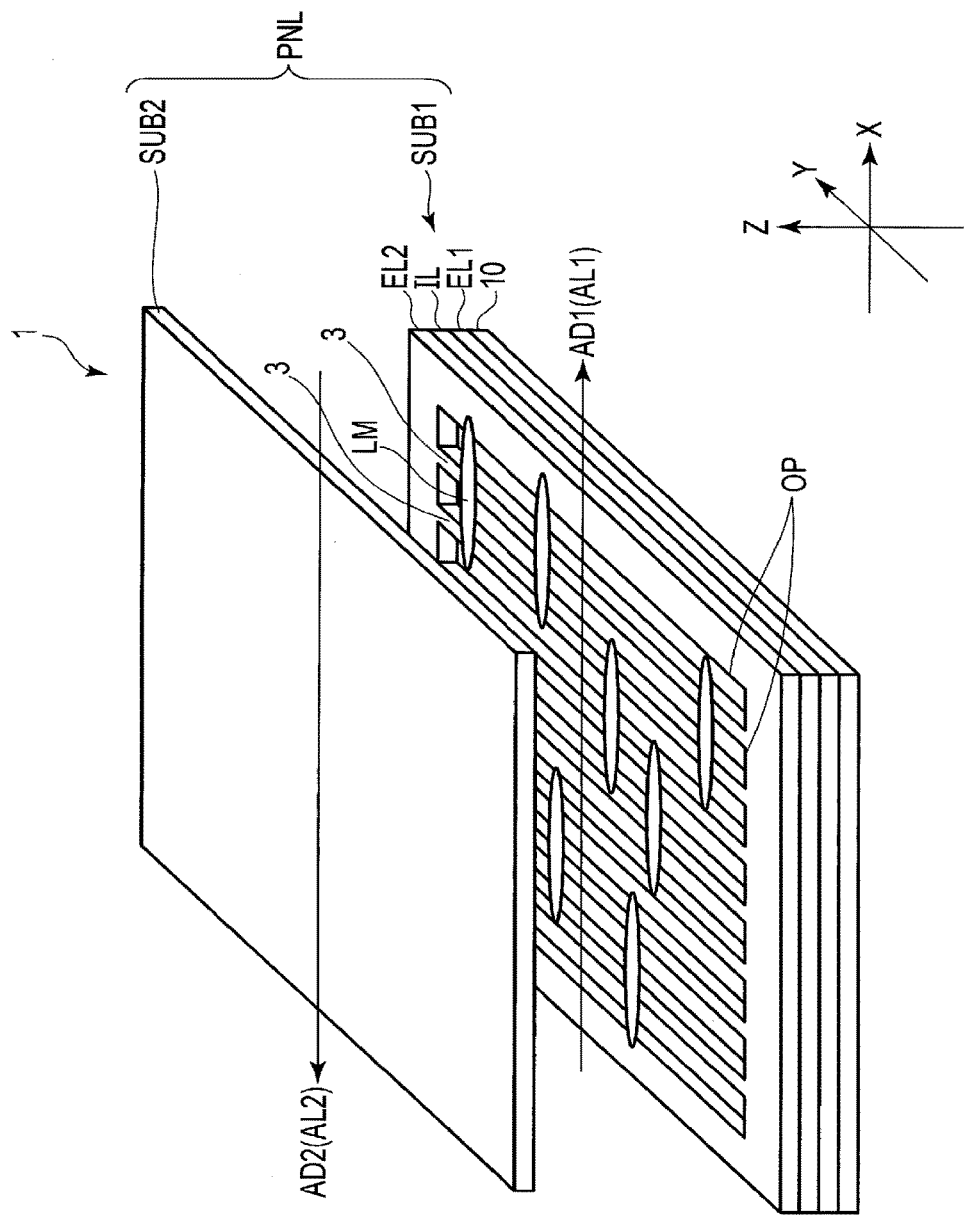
FIG. 2 is a perspective view showing an example of the structure of the liquid crystal device 1 indicative of both transparency and scattering.

FIG. 2 is a perspective view showing an example of the structure of the liquid crystal device 1 indicative of both transparency and scattering.

As shown in FIG. 2, the second electrode EL2 includes a plurality of openings OP and band-like electrode parts 3. That is, the openings OP and the electrode parts 3 are formed in a rectangular shape in the X-Y plane such that the long sides of the openings OP extend in the second direction Y. The openings OP and the electrode parts 3 are arranged alternately in the first direction X.

The first alignment film AL1 and the second alignment film AL2 are both subjected to an alignment treatment (such as a rubbing treatment or an optical alignment treatment) to be parallel to each other with reference to the X-Y plane. The first alignment film AL1 and the second alignment film AL2 have alignment directions AD1 and AD2, respectively, in the direction orthogonal to the long sides of the openings OP. In the example depicted, the alignment directions AD1 and AD2 extend in the first direction X. The alignment directions AD1 and AD2 are opposite to each other. Here, the alignment direction is a direction of alignment of the liquid crystal molecules LM in the no-voltage applied state, which is defined by the alignment restriction force of the first alignment film AL1 and the second alignment film AL2. If the liquid crystal molecules LM are preliminarily tilted, the directions of the major axes of the liquid crystal molecules LM which are orthogonally projecting to the X-Y plane are defined as the alignment directions.

Now, the operation of the liquid crystal device structured as above will be explained.

Here, a case where positive dielectric anisotropy liquid crystal molecules LM are sealed between the first substrate SUB1 and the second substrate SUB2 will be considered.

In the no-voltage applied state, a field is not formed between the first electrode EL1 and the second electrode EL2. Thus, the liquid crystal molecules LM in the liquid crystal layer are, as shown in FIG. 2, initially aligned in the first direction X which corresponds to the alignment directions AD1 and AD2 of the first alignment film AL1 and the second alignment film AL2 on the X-Y plane.

On the other hand, in the voltage applied state, a horizontal field is formed between the first electrode EL1 and the second electrode EL2. The horizontal field produced therein becomes orthogonal to the long sides of the openings OP in the X-Y plane. That is, the direction of the horizontal field produced in the voltage applied state is parallel to the initial alignment direction of the liquid crystal molecules LM in the no-voltage applied state.

Note that, if negative dielectric anisotropy liquid crystal molecules LM are sealed, the alignment directions AD1 and AD2 are set to be parallel to the long sides of the openings OP.

In the liquid crystal device 1 structured as above, the liquid crystal molecules LM behave as follows in the voltage applied state.

Figure 3:
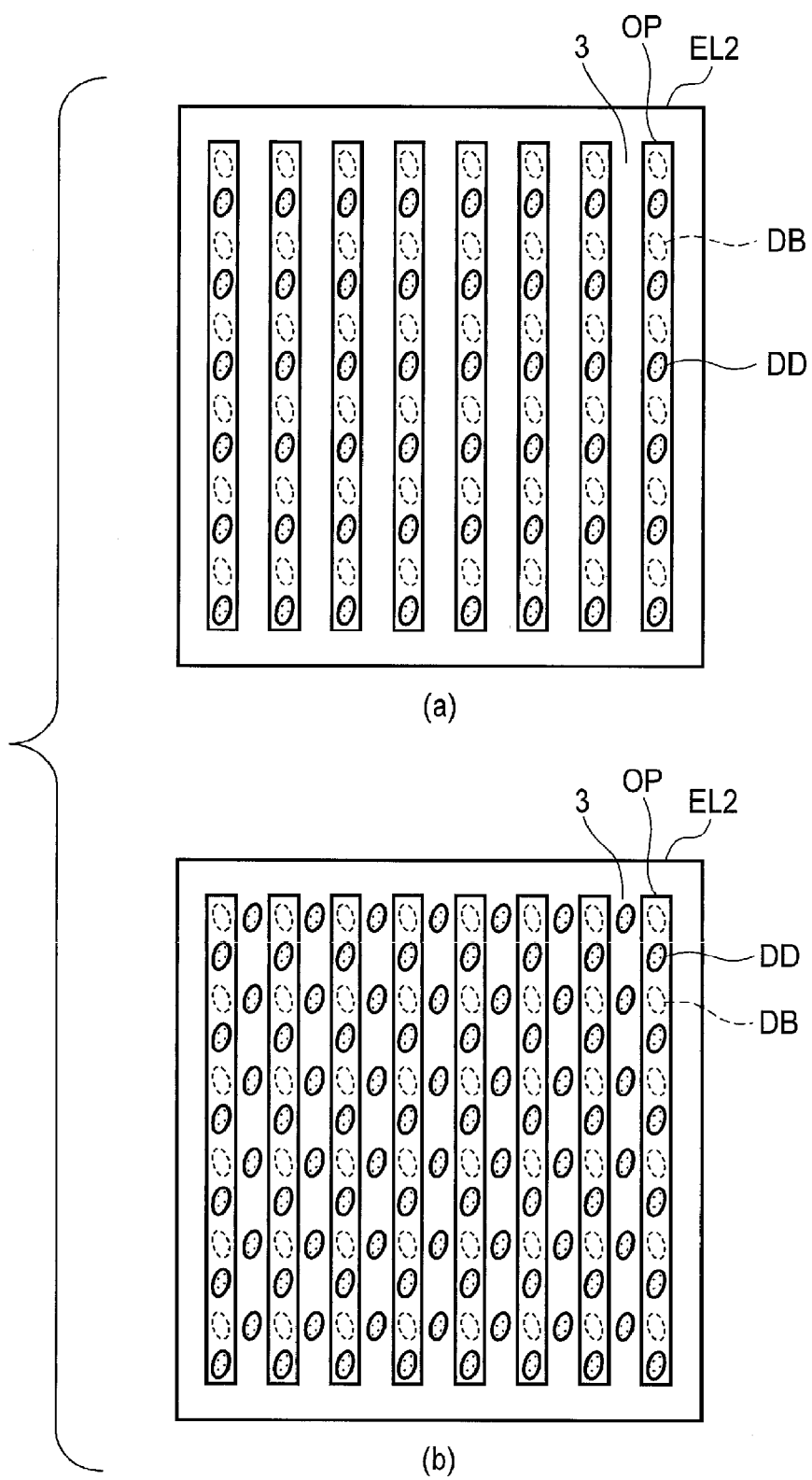
FIG. 3 is a schematic plan view showing liquid crystal textures in a voltage applied state in the liquid crystal device 1 of FIG. 2.
Figure 8:
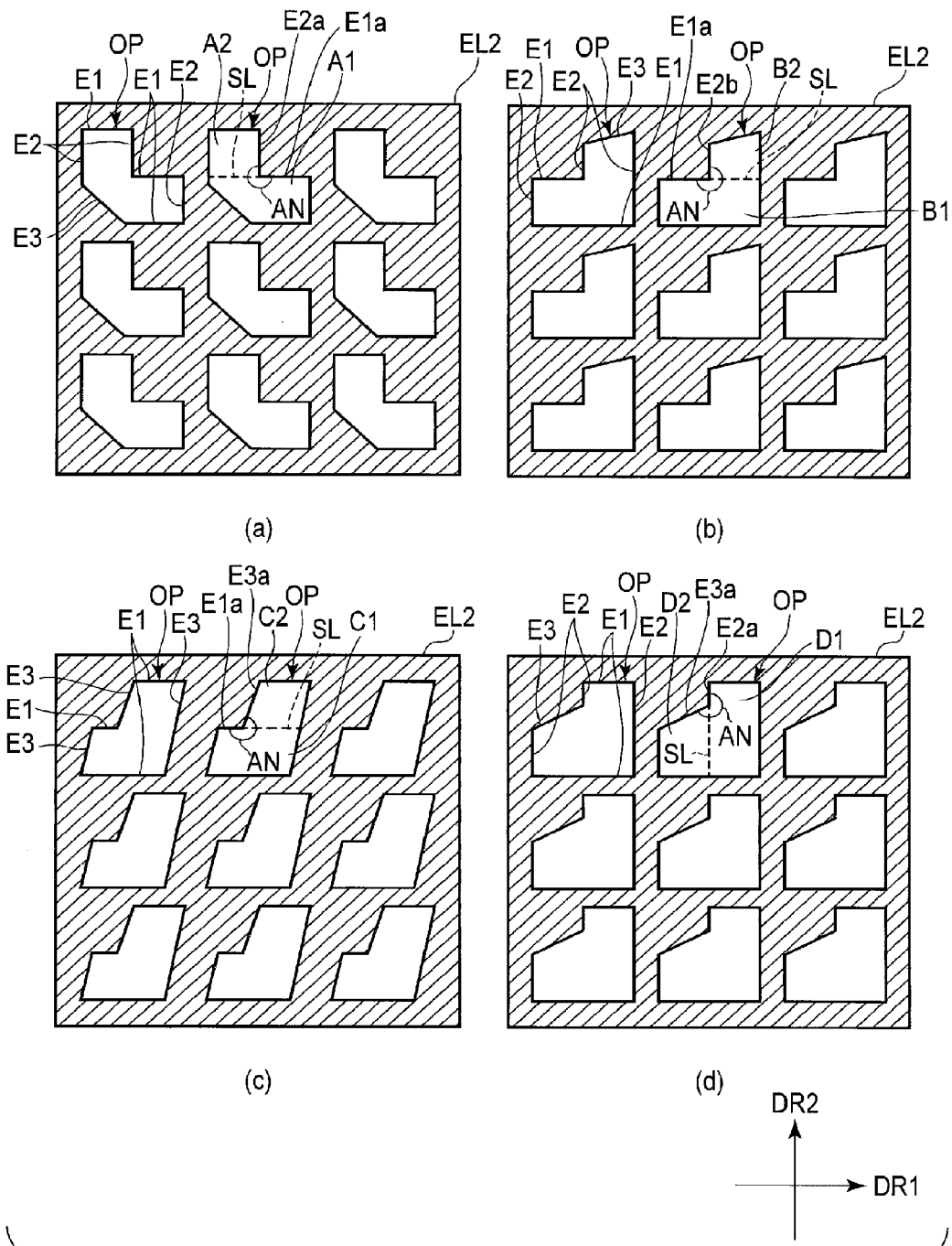
FIG. 8 is a plan view showing first to fourth variations of the second electrode.
Figure 9:
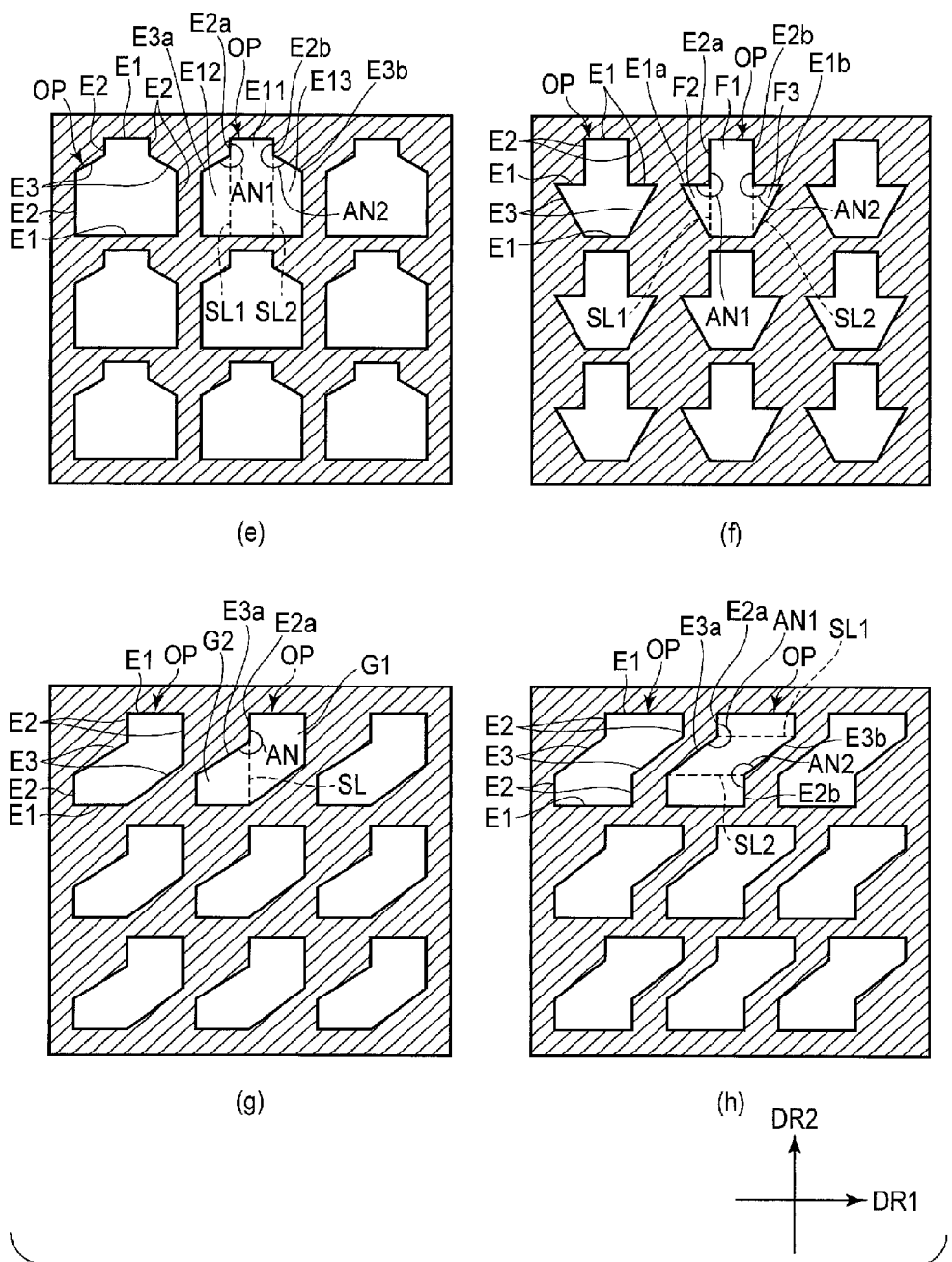
FIG. 9 is a plan view showing fifth to eighth variations of the second electrode EL2.
Figure 10:
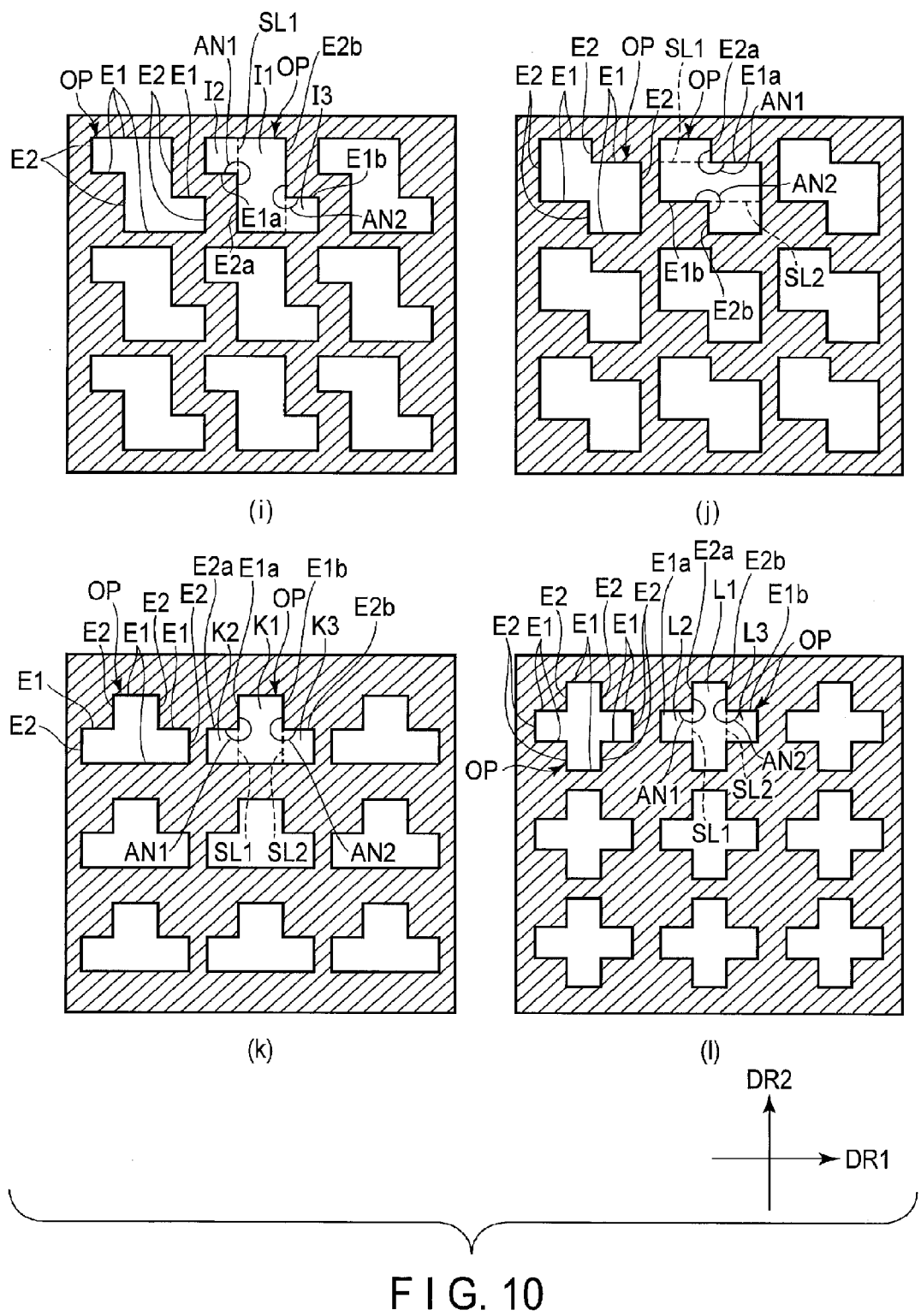
FIG. 10 is a plan view showing ninth to twelfth variations of the second electrode.

FIG. 3(a) and FIG. 3(b) are schematic plan views showing liquid crystal textures in the voltage applied state in the liquid crystal device 1 of FIG. 2.

Alternating current square waves of 60 Hz were applied gradually to the first electrode EL1 and the second electrode EL2 of the liquid crystal device 1 to amplitude of 10V and states were observed. For the sake of simplification of the observation, the liquid crystal device 1 was inserted between a pair of polarizers which are arranged in a crossed-Nicol relationship, and the liquid crystal molecules were observed microscopically in a state where the transmission axis of one polarizer and the initial alignment direction of the liquid crystal molecules form an angle of 20 degrees.

FIG. 3(a) is a schematic view of a result of the polarization microscopic observation when an applied voltage is 3V. FIG. 3(b) is a schematic view of a result of the polarization microscopic observation when the applied voltage is 3.5V. A significant change was not observed in the alignment state of the liquid crystal molecules LM until the amplitude of the applied voltage reached 2.5V. A plurality of domains appeared in the openings OP when the amplitude of the applied voltage reached 3V as shown in FIG. 3(a). The domains were arranged in the openings OP of the second electrode EL2, in which there were domains DD having clear boundaries and relatively dark inside and domains DB having unclear boundaries and relatively bright inside. Then, similar domains appeared on the electrode parts 3 of the second electrode when the amplitude of the applied voltage reached 3.5V as shown in FIG. 3(b). Then, as the amplitude of the applied voltage rose to 5V, the scattering intensified while no significant change was observed in the domains. From the above observation, it was understood that micro domains define boundaries of different refractivity by which the light is strongly scattered.

Thus, in the liquid crystal device 1 structure as above, the liquid crystal layer strongly scatters the light when a voltage is applied thereto. That is, the liquid crystal layer indicates transparency when a voltage is not applied thereto and indicates scattering when a certain voltage is applied thereto.

FIG. 4 is a plan view showing an example of the structure of the second electrode EL2 of the liquid crystal device 1 of the present embodiment. Here, the directions DR1 and DR2 are orthogonal to each other. For example, the second electrode EL2 may be disposed such that the direction DR1 corresponds to the first direction X and the direction DR2 corresponds to the second direction Y, or may be disposed such that the direction DR1 corresponds to the second direction Y and the direction DR2 corresponds to the first direction X.

In the example depicted, the second electrode EL2 includes a plurality of openings OP1 to OP9. Openings OP1 to OP3 are arranged in the direction DR1. Similarly, openings OP4 to OP6 are arranged in the direction DR1 and openings OP7 to OP9 are arranged in the direction DR1. Openings OP1, OP4, and OP7 are arranged in the direction DR2 in this order. Similarly, openings OP2, OP5, and OP8 are arranged in the direction DR2, and openings OP3, OP6, and OP9 are arranged in the direction DR2. That is, in the example depicted, openings OP1 to OP9 are arranged in a three-by-three matrix. Note that the number of the openings and their layout are not limited to the example depicted. In the openings formed in the second electrode, given that the one adjacent to a first opening in the direction DR1 is a second opening, and the one adjacent to the first opening in the direction DR2 is a third opening, the first opening is opening OP1, the second opening is opening OP2, and the third opening is opening OP4 in the example depicted.

Openings OP1 to OP9 are formed in the same L-shape. Since they are formed uniformly, the technical significance of the shape will be described with reference to one opening and its adjacent opening.

Now, the shape of opening OP1 in the figure is explained. The opening OP1 is defined by a plurality of edges E1 in the direction DR1 and a plurality of edges E2 in the direction DR2. In the example depicted, the opening OP1 includes three edges E1 and three edges E2. In the opening OP1, the total length of edges E1 and the total length of edges E2 are substantially equal.

Then, the shape of opening OP2 in the figure is explained. A separation line SL divides the opening OP2 into two areas R1 and R2. Note that the separation line SL is an imaginary line drawn continuously to the edge E1a parallel to the direction DR1 and it does not actually separate the opening OP2 apart. In the example depicted, the areas R1 and R2 are each formed in a quadrangular shape. Here, the edge E1a of the area R1 and the edge E2a of the area R2, which is parallel to the direction DR2, cross to form a crossing angle AN within the opening OP2. In the present embodiment, the crossing angle AN is greater than 180°. The separation line SL crosses the crossing point of the edges E1a and E2a.

When an opening is divided into two areas by a separation line SL, and a crossing angle AN which is greater than 180° is formed in the opening by two crossing edges of two areas, one area is defined as a projection projecting from the other area. That is, in the example of FIG. 4, the area R2 is a projection projecting from the area R1. That is, openings OP1 to OP9 are each formed as a polygon including a projection.

Note that the separation of the areas by the separation line SL is not limited to the above example. The separation line SL is drawn to cross the crossing point of two edges forming the crossing angle AN. The number of separation areas may be three or more and the number of projections may be two or more. In that case, the projections will be defined in the same manner as explained above.

Furthermore, in the example depicted, the area R2 is positioned in the positive side of the direction DR2 in each of the openings OP1 to OP9. Furthermore, the area R2 is positioned in a further negative side of the direction DR1 than is the edge E1a of the area R1. That is, the openings OP1 to OP9 are arranged in the same direction. At that time, the alignment directions AD1 and AD2 of FIG. 2 are parallel to the direction DR1, for example. The initial alignment direction of the liquid crystal molecules LM in the no-voltage applied state is parallel to the edges E1 and orthogonal to the edges E2.

In the liquid crystal device 1 including the second electrode EL2 with the above-shaped openings OP1 to OP9, as described above, the liquid crystal layer indicates transparency when a voltage is not applied thereto and indicates scattering when a certain voltage is applied thereto. In this example, a certain voltage is, for example, 8V or more.

FIG. 5 shows a relationship between a voltage (V) and scattering reflectivity of each of the liquid crystal device 1 including rectangular openings as shown in FIG. 2 and the liquid crystal device 1 including polygonal openings with projections as shown in FIG. 4.

The horizontal axis in the figure indicates a voltage (V) applied to the liquid crystal device in a range from 0 to 10V. Note that a value of the voltage indicates an absolute value of amplitude of the voltage. The vertical axis indicates scattering reflectivity. The value of scattering reflectivity represents a ratio where the scattering reflectivity of a complete white board is given 100%.

In the figure, L1 indicates scattering reflectivity with respect to a voltage value when a voltage is applied to the liquid crystal device 1 of FIG. 2. In the figure, L2 indicates scattering reflectivity with respect to a voltage value when a voltage is applied to the liquid crystal device including the second electrode of FIG. 4.

Lines L1 and L2 in the figure show that the scattering reflectivity increases when the voltage (V) reaches approximately 3V, and rises steeply when the voltage (V) reaches approximately 4V. Comparing line L1 to line L2, the scattering reflectivity of line L2 is generally greater than that of line L1 at the same voltage. Therefore, it is confirmed that the scattering reflectivity is greater in the embodiment where the second electrode EL2 includes polygonal openings OP with projections than the example where the second electrode EL2 includes rectangular openings OP when the applied voltage is the same.

FIG. 6(a) and FIG. 6(b) show a relationship between a voltage (V) and parallel light reflectivity measured when parallel light is incident from three incident points 100, 200, and 300 on each of the liquid crystal device 1 of the example of FIG. 2 and the liquid crystal device 1 of the present embodiment including the second electrode EL2 of FIG. 4. Furthermore, FIG. 7(a) and FIG. 7(b) show a positional relationship of incident points 100, 200, and 300.

FIG. 6(a) shows a relationship between a voltage (V) and parallel light reflectivity of the liquid crystal device 1 of the example of FIG. 2. FIG. 6(b) shows a relationship between a voltage (V) and parallel light reflectivity of the liquid crystal device 1 of the present embodiment as shown in FIG. 4. In FIG. 6(a) and FIG. 6(b), the horizontal axis indicates a voltage (V) applied to the liquid crystal device 1 and the vertical axis indicates the parallel light reflectivity. The value of parallel light reflectivity represents a ratio where the parallel light reflectivity of a complete white board is given 100%.

Here, in FIG. 6(a) and FIG. 6(b), line L3 indicates the parallel light reflectivity with respect to a voltage value measured when the light is incident on the incident point 100. Line L4 indicates the parallel light reflectivity with respect to a voltage value measured when the light is incident on the incident point 200. Line L5 indicates the parallel light reflectivity with respect to a voltage value measured when the light is incident on the incident point 300.

The incident points 100, 200, and 300 will be explained with reference to FIG. 7(a) and FIG. 7(b). As shown in FIG. 7(a), the incident points 100, 200, and 300 are inclined by 30 degrees with respect to normal N of the liquid crystal display panel PNL, as being viewed from a side surface. Furthermore, a light receiving point 400 which receives the light from the incident points 100, 200, and 300 is positioned on the normal N. Furthermore, as shown in FIG. 7(b), in the liquid crystal display panel PNL as being viewed in a plan view, the incident point 100 is positioned in the same direction as the alignment direction AD1, the incident point 200 is positioned to be inclined by forty five degrees with respect to the alignment direction AD1, and the incident point 300 is positioned to be right-angled with respect to the alignment direction AD1.

As in FIG. 6(a), lines L4 and L5 show that the parallel light reflectivity is substantially equal when the voltage value is equal. Lines L3, L4, and L5 in the proximity of 3V where a change in the domains of the liquid crystal molecules begins show that the parallel light reflectivity of line L3 is greater than that of each of lines L4 and L5. From this point, it is understood that the liquid crystal device 1 of the example reflects the light from the incident point 100 brighter as compared to the light from the incident point 200 and the light from the incident point 300.

In the example of FIG. 6(b), a difference between lines L3 to L5 when the voltage value is equal is less significant than the difference between line L3 and lines L4 and L5 in the example of FIG. 6(a). Furthermore, the parallel light reflectivity of each of lines L4 and L5 in the example of FIG. 6(b) is greater than the case of FIG. 6(a) where the parallel light reflectivity of each of lines L4 and L5 keeps approximately 0 regardless of the voltage value. From this point, it is understood that the liquid crystal device 1 of the present embodiment reflects the light from the incident points 100, 200, and 300 at the parallel light reflectivity of substantially the same intensity.

As can be understood from the above, the direction dependency of the parallel light reflectivity further decreases in the embodiment where the second electrode EL2 including polygonal openings OP with projections as compared to the example where the second electrode EL2 including rectangular openings OP.

In the present embodiment, the liquid crystal device 1 includes, on the first substrate SUB1, a first electrode EL1 and a second electrode EL2 including openings OP1 to OP9. The liquid crystal layer LC indicates scattering when a voltage of a certain value or more is applied to the first electrode EL1 and the second electrode EL2 and indicates transparency when no voltage is applied to the first electrode EL1 or the second electrode EL2.

Furthermore, the opening OP formed in a polygonal shape with a projection. Edges defining the opening OP include edges E1 which are parallel to the initial alignment direction and edges E2 which are orthogonal to the initial alignment direction where the total length of edges E1 and the total length of edges E2 are substantially equal. A field aligning the liquid crystal molecules LM is formed to be orthogonal to the edges. Therefore, when a voltage excess to a level for a normal use (such as 5V) is applied, a plurality of micro domains in which the liquid crystal molecules LM are aligned in various directions and boundaries of much different refractivity can be formed.

Thus, as compared to the example in which the second electrode EL2 including rectangular openings OP, the present embodiment can improve the scattering reflectivity, and furthermore, can reduce a difference in the parallel light reflectivity caused when the liquid crystal display panel PNL is viewed from different standpoints and can improve the direction dependency of the parallel light reflectivity.

Therefore, high performance liquid crystal devices of scattering type which use a horizontal field can be achieved.

Furthermore, as compared to the example in which the second electrode EL2 including rectangular openings OP, the arrangement of the openings OP in directions DR1 and DR2 can form much isotropic reflectivity distribution and can further improve the direction dependency of the parallel light reflectivity.

Now, some variations of the embodiment will be explained.

FIG. 8(a), FIG. 8(b), FIG. 8(c), and FIG. 8(d) are plan views showing first to fourth variations of the second electrode EL2.

Openings OP in the examples of FIGS. 8(a) to 8(d) include inclining edges E3 with respect to the directions DR1 and DR2. This is a difference from the openings OP of the example of FIG. 4.

In the example of FIG. 8(a), the openings OP are formed in the same shape. Each opening OP includes three edges E1, three edges E2, and one edge E3. For example, an opening OP is divided into areas A1 and A2 by a separation line SL. In the example depicted, the areas A1 and A2 are quadrangles. Here, an edge E1a of the area A1 and an edge E2a of the area A2 form a crossing angle AN at their crossing point in the opening. That is, in the example of FIG. 8(a), the area A2 corresponds to a projection projecting from the area A1.

In the example of FIG. 8(b), the openings OP are formed in the same shape. Each opening OP includes two edges E1, three edges E2, and one edge E3. For example, an opening OP is divided into areas B1 and B2 by a separation line SL. In the example depicted, the areas B1 and B2 are quadrangles. Here, an edge E1a of the area B1 and an edge E2a of the area B2 form a crossing angle AN at their crossing point in the opening. That is, in the example of FIG. 8(b), the area B2 corresponds to a projection projecting from the area B1.

In the example of FIG. 8(c), the openings OP are formed in the same shape. Each opening OP includes three edges E1, three edges E3. For example, an opening OP is divided into areas C1 and C2 by a separation line SL. In the example depicted, the areas C1 and C2 are quadrangles. Here, an edge E1a of the area C1 and an edge E3a of the area C2 form a crossing angle AN at their crossing point in the opening. That is, in the example of FIG. 8(c), the area C2 corresponds to a projection projecting from the area C1.

In the example of FIG. 8(d), the openings OP are formed in the same shape. Each opening OP includes two edges E1, three edges E2, and one edge E3. For example, an opening OP is divided into areas D1 and D2 by a separation line SL. In the example depicted, the areas D1 and D2 are quadrangles. Here, an edge E2a of the area D1 and an edge E3a of the area D2 form a crossing angle AN in the opening. That is, in the example of FIG. 8(d), the area D2 corresponds to a projection projecting from the area D1.

In the variations of FIGS. 8(a) to 8(d), the openings OP are formed in a polygonal shape with projections. Thus, the advantages obtained in the above-described embodiment can be achieved similarly. Note that, the openings OP are formed in the same direction in the examples of FIGS. 8(a) to 8(d).

FIG. 9(e), FIG. 9(f), FIG. 9(g), and FIG. 9(h) are plan views showing fifth to eighth variations of the second electrode EL2.

In the example of FIG. 9(e), the openings OP are formed in the same shape. Each opening OP includes two edges E1, four edges E2, and two edges E3. For example, an opening OP is divided in areas E11 to E13 by separation lines SL1 and SL2. In the example depicted, the areas E11 to E13 are quadrangles. Here, an edge E2a of the area E11 and an edge E3a of the area E12 form a crossing angle AN1 at their crossing point in the opening. An edge E2b of the area E11 and an edge E3a of the area E13 form a crossing angle AN2 in the opening. That is, in the example of FIG. 9(e), the areas E12 and E13 correspond to two projections projecting from the area E11.

In the example of FIG. 9(f), the openings OP are formed in the same shape. Each opening OP includes four edges E1, two edges E2, and two edges E3. For example, an opening OP is divided in areas F1 to F3 by separation lines SL1 and SL2. In the example depicted, the area F1 is a quadrangle and the areas F2 and F3 are triangles. Here, an edge E2a of the area F1 and an edge E1a of the area F2 form a crossing angle AN1 at their crossing point in the opening. An edge E2b of the area F1 and an edge E1b of the area F3 form a crossing angle AN2 at their crossing point in the opening. That is, in the example of FIG. 9(f), the areas F2 and F3 correspond to two projections projecting from the area F1.

In the example of FIG. 9(g), the openings OP are formed in the same shape. Each opening OP includes two edges E1, three edges E2, and two edges E3. For example, an opening OP is divided into areas G1 and G2 by a separation line SL. In the example depicted, the areas G1 and G2 are quadrangles. Here, an edge E2a of the area G1 and an edge E3a of the area G2 form a crossing angle AN at their crossing point in the opening. That is, in the example depicted in FIG. 9(g), the area G2 corresponds to a projection projecting from the area G1.

In the example of FIG. 9(h), the openings OP are formed in the same shape. Each opening OP includes two edges E1, four edges E2, and two edges E3. For example, an opening OP is divided into areas H1 to H3 by separation lines SL1 and SL2. In the example depicted, the areas H1 to H3 are quadrangles. Here, an edge E3a of the area H1 and an edge E2a of the area H2 form a crossing angle AN1 at their crossing point in the opening. An edge E3b of the area H1 and an edge E2b of the area H3 form a crossing angle AN2 at their crossing point in the opening. That is, in the example depicted in FIG. 9(h), the areas H2 and H3 correspond to two projections projecting from the area H1.

In the variations of FIGS. 9(e) to 9(h), the openings OP are formed in a polygonal shape with projections. Thus, the advantages obtained in the above-described embodiment can be achieved similarly. Note that, the openings OP are formed in the same direction in the examples of FIGS. 9(e) to 9(h).

FIG. 10(i), FIG. 10(j), FIG. 10(k), and FIG. 10(l) are plan views showing ninth to twelfth variations of the second electrode EL2.

In the example of FIG. 10(i), the openings OP are formed in the same shape. Each opening OP includes four edges E1 and four edges E2. For example, an opening OP is divided into areas I1 to I3 by separation lines SL1 and SL2. In the example depicted, the areas I1 to I3 are quadrangles. Here, an edge E2a of the area I1 and an edge E1a of the area I2 form a crossing angle AN1 at their crossing point in the opening. An edge E2b of the area I1 and an edge E1b of the area I3 form a crossing angle AN2 at their crossing point in the opening. That is, in the example depicted in FIG. 10(i), the areas I2 and I3 correspond to two projections projecting from the area I1.

In the example of FIG. 10(j), the openings OP are formed in the same shape. Each opening OP includes four edges E1 and four edges E2. For example, an opening OP is divided into areas J1 to J3 by separation lines SL1 and SL2. In the example depicted, the areas J1 to J3 are quadrangles. Here, an edge E1a of the area J1 and an edge E2a of the area J2 form a crossing angle AN1 at their crossing point in the opening. An edge E1b of the area J1 and an edge E2b of the area J3 form a crossing angle AN2 at their crossing point in the opening. That is, in the example depicted in FIG. 10(j), the areas J2 and J3 correspond to two projections projecting from the area J1.

In the example of FIG. 10(k), the openings OP are formed in the same shape. Each opening OP includes four edges E1 and four edges E2. For example, an opening OP is divided into areas K1 to K3 by separation lines SL1 and SL2. In the example depicted, the areas K1 to K3 are quadrangles. Here, an edge E1a of the area K1 and an edge E2a of the area K2 form a crossing angle AN1 at their crossing point in the opening. An edge E1b of the area K1 and an edge E2b of the area K3 form a crossing angle AN2 at their crossing point in the opening. That is, in the example depicted in FIG. 10(k), the areas K2 and K3 correspond to two projections projecting from the area K1.

In the example of FIG. 10(l), the openings OP are formed in the same shape. Each opening OP includes six edges E1 and six edges E2. For example, an opening OP is divided into areas L1 to L3 by separation lines SL1 and SL2. In the example depicted, the areas L1 to L3 are quadrangles. Here, an edge E2a of the area L1 and an edge E1a of the area L2 form a crossing angle AN1 at their crossing point in the opening. An edge E2b of the area L1 and an edge E1b of the area L3 form a crossing angle AN2 at their crossing point in the opening. That is, in the example depicted in FIG. 10(l), the areas L2 and L3 correspond to two projections projecting from the area L1.

In the variations of FIGS. 10(i) to 10(l), the openings OP are formed in a polygonal shape with projections. Thus, the advantages obtained in the above-described embodiment can be achieved similarly. Note that, the openings OP are formed in the same direction in the examples of FIGS. 10(i) to 10(l).

Figure 11:
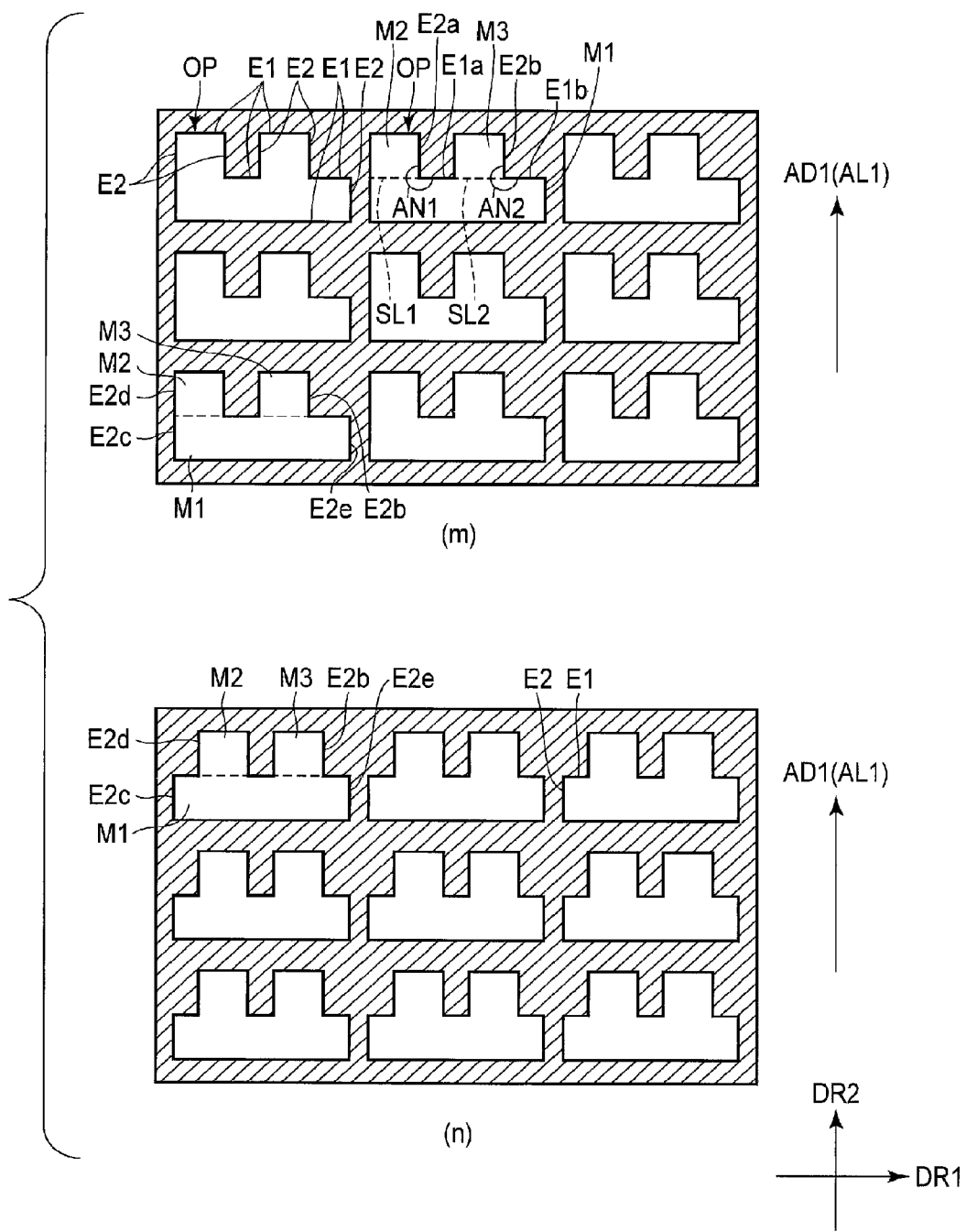
FIG. 11 is a plan view showing thirteenth and fourteenth variations of the second electrode.

FIG. 11(m) and FIG. 11(n) are plan views showing thirteenth and fourteenth variations of the second electrode.

In the example of FIG. 11(m), the openings OP are formed in the same shape. Each opening OP includes five edges E1 and five edges E2. For example, an opening OP is divided into areas M1 to M3 by separation lines SL1 and SL2. In the example depicted, the areas M1 to M3 are quadrangles. Here, an edge E1a of the area M1 and an edge E2a of the area M2 form a crossing angle AN1 at their crossing point in the opening. An edge E1b of the area M1 and an edge E2b of the area M3 form a crossing angle AN2 at their crossing point in the opening. That is, in the example depicted in FIG. 11(m), the areas M2 and M3 correspond to two projections projecting from the area M1.

Here, the areas M2 and M3 project in the same direction, and in the example depicted, they project from the area M1 in the positive direction of the direction DR2. An edge E2c of the area M1 and an edge E2d of the area M2 are formed continuously.

Furthermore, an edge E2a of the area M1 and the edge E2b of the area M3 are formed discontinuously to be shifted from each other.

As compared to the example of FIG. 11(m), the positions of areas M2 and M3 with respect to area M1 are different in the example of FIG. 11(n). Furthermore, the opening OP of the example of FIG. 11(n) has one more edge E1 and one more edge E2 as compared to the opening OP of the example of FIG. 11(m).

In the example of FIG. 11(n), the areas M2 and M3 project in the same direction, and they project from the area M1 in the positive direction of the direction DR2. An edge E2c of the area M1 and an edge E2d of the area M2 are formed continuously. Furthermore, an edge E2e of the area M1 and an edge E2b of the area M3 are formed discontinuously to be shifted from each other.

In the variations of FIGS. 11(m) and 11(n), the openings OP are formed in a polygonal shape with projections. Thus, the advantages obtained in the above-described embodiment can be achieved similarly. Note that, in the examples of FIG. 11(m) and FIG. 11(n), the openings OP are formed in the same direction. Furthermore, the alignment direction AD1 of the first alignment film AL1 extends in the direction DR2. That is, the alignment direction AD1 is parallel to the direction of the projection of the areas M2 and M3 from the area M1.

Figure 12:
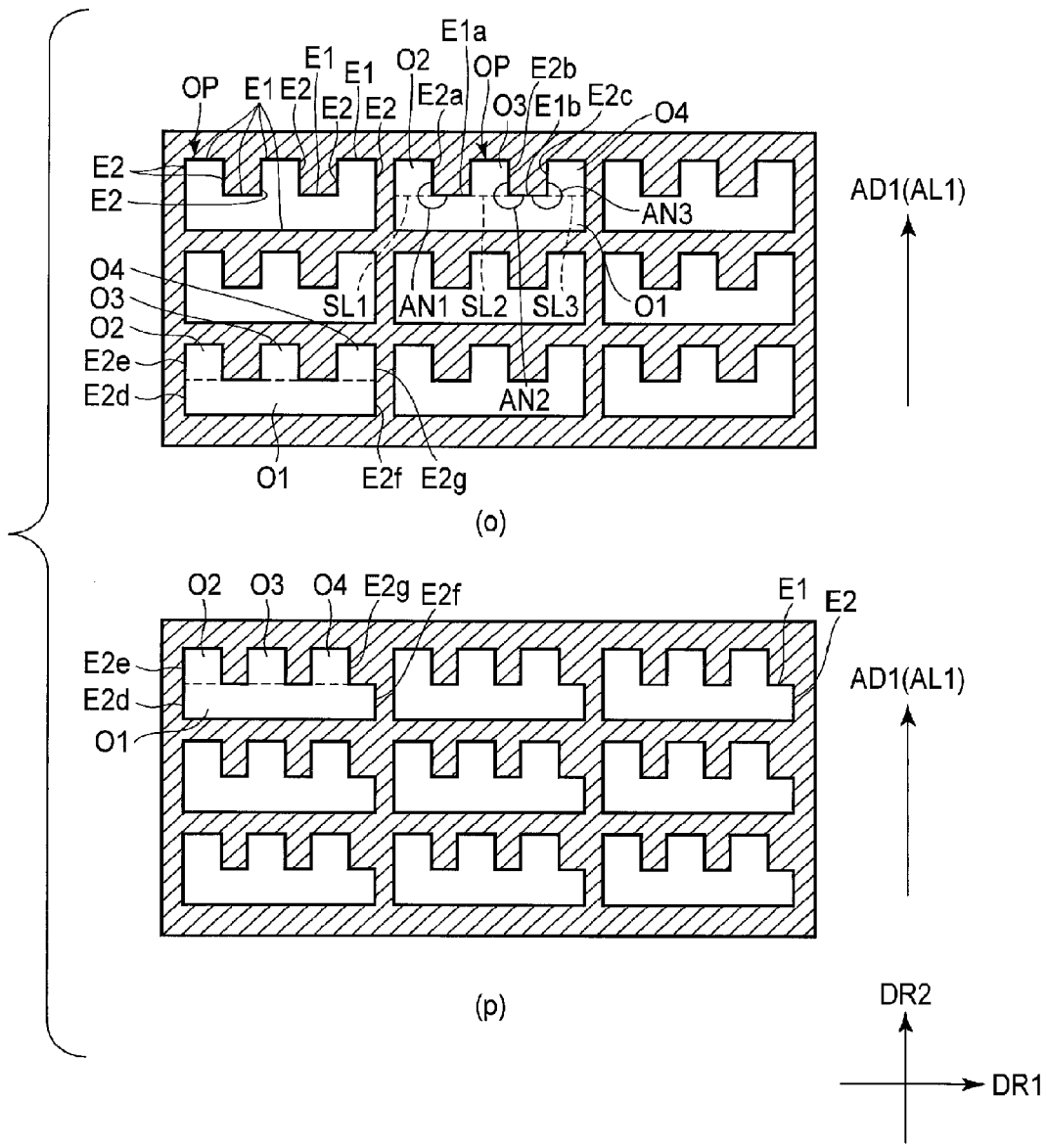
FIG. 12 is a plan view showing fifteenth and sixteenth variations of the second electrode.

FIG. 12(o) and FIG. 12(p) are plan views showing fifteenth and sixteenth variations of the second electrode.

In the example of FIG. 12(o), the openings OP are formed in the same shape. Each opening OP includes six edges E1 and six edges E2. For example, an opening OP is divided into areas O1 to O4 by separation lines SL1 to SL3. In the example depicted, the areas O1 to O4 are quadrangles. Here, an edge E1a of the area O1 and an edge E2a of the area O2 form a crossing angle AN1 at their crossing point in the opening. An edge E1b of the area O1 and an edge E2b of the area O3 form a crossing angle AN2 at their crossing point in the opening. The edge E1b of the area O1 and an edge E2c of the area O4 form a crossing angle AN3 at their crossing point in the opening. That is, in the example depicted in FIG. 12(o), the areas O2 to O4 correspond to three projections projecting from the area O1.

Here, the areas O2 to O4 project in the same direction, and they project from the area O1 in the positive direction of the direction DR2. An edge E2d of the area O1 and an edge E2e of the area O2 are formed continuously. Furthermore, an edge E2f of the area O1 and an edge E2g of the area O4 are formed continuously. The area O3 is disposed between the areas O2 and O4.

As compared to the example of FIG. 12(o), the positions of areas O2 to O4 with respect to area O1 are different in the example of FIG. 12(p). Furthermore, the opening OP of the example of FIG. 12(p) has one more edge E1 and one more edge E2 as compared to the opening OP of the example of FIG. 12(o).

In the example of FIG. 12(p), the areas O2 and O4 project in the same direction, and they project from the area O1 in the positive direction of the direction DR2. An edge E2d of the area O1 and an edge E2e of the area O2 are formed continuously. Furthermore, an edge E2f of the area O1 and an edge E2g of the area O4 are formed discontinuously to be shifted from each other.

In the variations of FIGS. 12(o) and 12(p), the openings OP are formed in a polygonal shape with projections. Thus, the advantages obtained in the above-described embodiment can be achieved similarly. Note that, in the examples of FIG. 12(o) and FIG. 12(p), the openings OP are formed in the same direction. Furthermore, the alignment direction AD1 of the first alignment film AL1 extends in the direction DR2. That is, the alignment direction AD1 is parallel to the direction of the projection of the areas O2 to O4 from the area O1.

FIG. 13(q), FIG. 13(r), and FIG. 13(s) are plan views showing seventeenth to nineteenth variations of the second electrode.

The second electrodes EL2 of the examples of FIGS. 13(q) to 13(s) include openings OP directed differently from those of the second electrode EL2 of the example of FIG. 4.

In the example of FIG. 13(q), openings OP1, OP5, OP9, and OP13 are formed in the same direction. Openings OP2, OP6, OP10, and OP14 are formed in the same direction. Openings OP3, OP7, OP11, and OP15 are formed in the same direction. Openings OP4, OP8, OP12, and OP16 are formed in the same direction. Opening OP2 is shaped as opening OP1 rotated 180 degrees with respect to a point Q. That is, openings OP1 and OP2 are symmetrical with respect to the point Q. Opening OP3 is shaped as opening OP1 flipped with respect to a line LQ1. That is, openings OP1 and OP3 are symmetrical with respect to the line LQ1. Opening OP4 is shaped as opening OP1 flipped with respect to a line LQ2. That is, openings OP1 and OP4 are symmetrical with respect to the line LQ2.

In the example of FIG. 13(r), openings OP1, OP3, OP9, and OP11 are formed in the same direction. Openings OP2, OP4, OP10, and OP12 are formed in the same direction. Openings OP5, OP7, OP13, and OP15 are formed in the same direction. Openings OP6, OP8, OP14, and OP16 are formed in the same direction.

Opening OP2 is shaped as opening OP1 flipped with respect to a line LR1. That is, openings OP1 and OP2 are symmetrical with respect to the line LR1. Opening OP5 is shaped as an opening OP1 flipped with respect to a line LR2. That is, openings OP1 and OP5 are symmetrical with respect to the line LR2. Opening OP6 is shaped as opening OP1 rotated 180 degrees with respect to a point R. That is, openings OP1 and OP6 are symmetrical with respect to the point R.

In the example of FIG. 13(r), the openings OP are arranged four-by-four. In each column, two types of the openings OP are arranged repeatedly. In each row, two types of the openings OP are arranged repeatedly.

As compared to the second electrode EL2 of FIG. 4, the second electrode EL2 of the example of FIG. 13(s) includes differently-shaped openings OP1 to OP6. Openings OP1 to OP3 are adjacent to each other in the direction DR1 and openings OP4 to OP6 are adjacent to each other in the direction DR1. Openings OP1 and OP4, openings OP2 and OP5, and openings OP3 and OP6 are adjacent to each other in the direction DR2 in this order.

In the example of FIG. 13(s), the openings OP are formed in the same shape. Each opening OP includes four edges E1 and four edges E2. For example, an opening OP2 is divided into areas S1 to S3 by separation lines SL1 and SL2. In the example depicted, the areas S1 to S3 are quadrangles. Here, an edge E2a of the area S1 and an edge E1a of the area S2 form a crossing angle AN1 at their crossing point in the opening. An edge E2a of the area S1 and an edge E1b of the area S3 form a crossing angle AN2 at their crossing point in the opening. That is, in the example depicted in FIG. 13(s), the areas S2 and S3 correspond to two projections projecting from the area S1.

Openings OP1 to OP3 are formed in the same direction. Openings OP3 to OP6 are formed in the same direction. Opening OP4 is shaped as opening OP1 flipped with respect to a line LS. That is, openings OP1 and OP4 are symmetrical with respect to the line LS.

Figure 13:
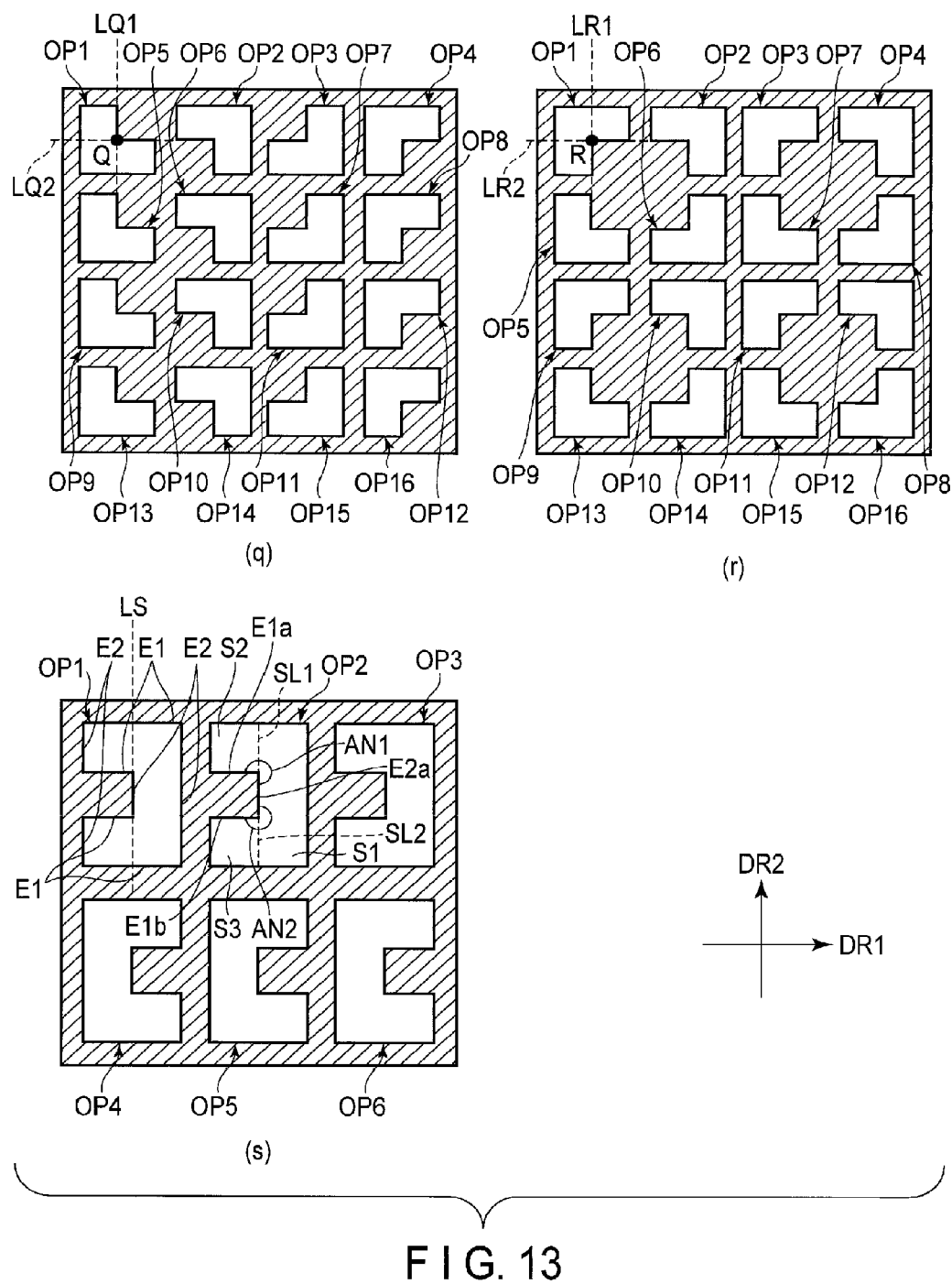
FIG. 13 is a plan view showing seventeenth to nineteenth variations of the second electrode.

Note that, in the openings OP in the variations of FIGS. 8 to 12, a first opening and its adjacent opening may be arranged symmetrically with respect to a particular point or a particular line as in the variations of FIG. 13. That is, the openings OP may be formed in some different directions in the variations of FIGS. 8 to 12.

Note that the shapes of the openings OP of the second electrode EL2 are not limited to those of the above examples, and may be changed optionally. Furthermore, the length of each of the edges E1 to E3 can arbitrarily be changed.

FIG. 14 is a cross-sectional view of a variation of the liquid crystal device 1 of the present embodiment.

The liquid crystal device 1 of the example of FIG. 14 includes a first substrate SUB1 which includes a reflective layer RF. In this respect, the liquid crystal device 1 of the example of FIG. 14 is different from that of the example of FIG. 1.

The reflective layer RF is disposed on a first insulating substrate 10. An insulating film 100 is interposed between the reflective layer RF and the first electrode EL1. That is, the reflective layer RF is positioned under the first electrode EL1. The reflective layer RF is formed of a highly reflective metal material such as aluminum or silver.

Note that, the reflective layer RF may be formed inside the liquid crystal display panel PNL as depicted, or a reflective plate may be disposed outside the first insulating substrate 10 (in the side opposite to the surface opposed to the liquid crystal layer LC).

Furthermore, in the structure including the reflective layer RF, an auxiliary light source may be provided outside a second insulating substrate 30.

The advantages obtained in the above-embodiment can be achieved similarly in such a variation.

FIG. 15 is a plan view showing an example in which the liquid crystal device 1 of the present embodiment is used in a display device.

A liquid crystal display panel PNL includes a first substrate SUB1, second substrate SUB2 opposed to the first substrate SUB1, and liquid crystal layer LC held between the first substrate SUB1 and the second substrate SUB2. The first substrate SUB1 and the second substrate SUB2 are adhered together by a sealant SE with a certain cell gap formed therebetween. The liquid crystal layer LC is maintained inside the area surrounded by the sealant SE within the cell gap between the first substrate SUB1 and the second substrate SUB2. The liquid crystal display panel PNL includes an active area ACT by which an image is displayed inside the area surrounded by the sealant. The active area ACT is, for example, a substantial rectangle including a plurality of pixels PX formed in a matrix.

The first substrate SUB1 includes, in the active area ACT, gate lines G extending in the first direction X, source lines S extending in a second direction Y crossing the first direction X, switching element SW electrically connected to the gate line G and the source line S in each pixel PX, pixel electrode PE electrically connected to the switching element SW in each pixel PX, and the like. The common electrode CE is disposed in the first substrate SUB1.

Signal supply sources such as a driver IC chip 2 and a flexible printed circuit (FPC) 3, which are used for the drive of the liquid crystal display panel PNL, are positioned in a periphery area PRP outside the active area ACT.

Figure 16:
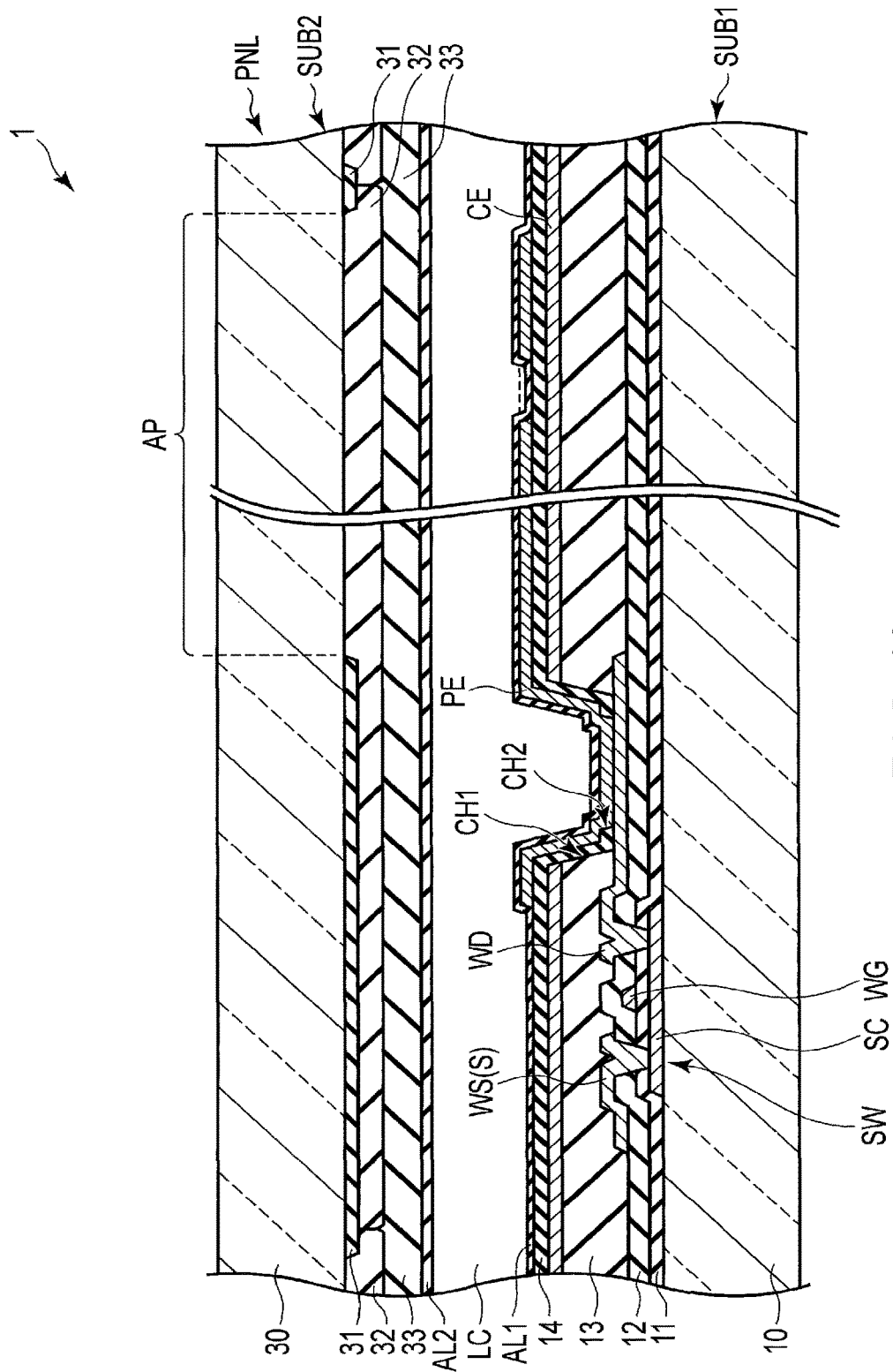
FIG. 16 is a cross-sectional view showing the structure of the liquid crystal device 1 of FIG. 15.

FIG. 16 is a cross-sectional view showing the structure of the liquid crystal device 1 of FIG. 15.

The first substrate SUB1 includes, on the surface of the first insulating substrate 10 opposed to the second substrate SUB2, a switching element SW, common electrode CE, pixel electrode PE, first insulating film 11, second insulating film 12, third insulating film 13, fourth insulating film 14, first alignment film AL1, and the like.

The switching element SW includes a semiconductor layer SC, gate electrode WG, source electrode WS, drain electrode WD, and the like. The semiconductor layer SC is disposed on the first insulating substrate 10 and is covered with the first insulating film 11. The gate electrode WG is disposed on the first insulating film 11 to be directly above the semiconductor layer SC. The gate electrode WG is electrically connected to the gate lines G and is covered with the second insulating film 12. The source electrode WS and the drain electrode WD are disposed on the second insulating film 12 and are covered with the third insulating film 13. The source electrode WS is electrically connected to the source lines S. The source electrode WS and the drain electrode WD are electrically connected to the semiconductor layer SC.

The common electrode CE is disposed on the third insulating film 13. The fourth insulating film 14 is disposed on the common electrode CE.

The pixel electrode PE is disposed on the fourth insulating film 14 and is opposed to the common electrode CE. The pixel electrode PE is electrically connected to the drain electrode WD via a contact hole CH1 passing through the third insulating film 13 and a contact hole CH2 passing through the fourth insulating film 14. The common electrode CE and the pixel electrode PE are formed of a transparent conductive material such as ITO or IZO. The pixel electrode PE is covered with the first alignment film AL1.

Here, the common electrode corresponds to the first electrode of the embodiment, the pixel electrode PE corresponds to the second electrode of the embodiment, and the fourth insulating film 14 corresponds to the interlayer insulating film IL.

The second substrate SUB2 includes, on the surface of the second insulating substrate 30 opposed to the first substrate SUB1, a light shielding layer 31, color filter 32, overcoat layer 33, second alignment film AL2, and the like. Note that each of the first insulating substrate 10 and the second insulating substrate 30 is a light transmissive substrate such as a glass substrate or a resin substrate.

The light shielding layer 31 defines each pixel PX and forms apertures AP, and is opposed to the lines such as gate lines G, source lines S, and switching elements SW. The color filter 32 is arranged in the aperture AP. The color filter 32 includes different color filters of primary colors such as red, blue, and green. Each boundary of different color filters 32 is arranged to overlap the light shielding layer 31.

The overcoat layer 33 covers the color filter 32. The overcoat layer 33 is covered with the second alignment film AL2. The first alignment film AL1 and the second alignment film AL2 are formed of a horizontal-alignment material.

Even if the embodiment is applied to a liquid crystal device DSP, the above-described advantages can be achieved similarly.

The liquid crystal device of scattering type of the embodiment can be used as a display, or can be used as a privacy film by which an image on the liquid crystal panel becomes unrecognizable by scattering the light on the entire surface. In such an entire-surface scattering state, the surface can be used as a screen on which an image is projected by a projector.

Therefore, the embodiment and its variations can achieve high performance liquid crystal devices of scattering type which use a horizontal field.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal device, comprising:
a first substrate including a first electrode and a second electrode opposed to the first electrode;
a second substrate opposed to the first substrate; and
a liquid crystal layer including liquid crystal molecules held between the first substrate and the second substrate, wherein
the second electrode is positioned closer to the liquid crystal layer than is the first electrode, and has a polygonal-shaped first opening including at least one projection, a second opening adjacent to the first opening in a first direction, and a third opening adjacent to the first opening in a second direction which crosses the first direction, and
the liquid crystal layer indicates transparency when no voltage is applied thereto and indicates scattering when a voltage is applied thereto.

2. The liquid crystal device of claim 1, wherein the first opening includes a first edge which is parallel to an initial alignment direction of the liquid crystal molecules when no voltage is applied thereto and a second edge which is vertical to the initial alignment direction.

3. The liquid crystal device of claim 1, wherein the first opening, the second opening, and the third opening are formed in the same shape.

4. The liquid crystal device of claim 3, wherein the first opening, the second opening, and the third opening are formed in the same direction.

5. The liquid crystal device of claim 3, wherein a shape of the second opening and a shape of the first opening are symmetrical with respect to a particular line or a particular point.

6. The liquid crystal device of claim 1, wherein the first electrode is a reflective layer and the second electrode is a transparent conductive layer.

7. The liquid crystal device of claim 1, wherein each of the first electrode and the second electrode is a transparent conductive layer.

8. The liquid crystal device of claim 7, wherein the first substrate further includes a reflective layer.

9. A liquid crystal device, comprising:
a first substrate including a first electrode and a second electrode opposed to the first electrode;
a second substrate opposed to the first substrate; and
a liquid crystal layer including liquid crystal molecules held between the first substrate and the second substrate, wherein
the second electrode is positioned closer to the liquid crystal layer than is the first electrode, and has a polygonal-shaped first opening including a plurality of projections projecting in the same direction, a second opening adjacent to the first opening in a first direction, and a third opening adjacent to the first opening in a second direction which crosses the first direction, and
the liquid crystal layer indicates transparency when no voltage is applied thereto and indicates scattering when a voltage is applied thereto.

10. The liquid crystal device of claim 9, wherein the first opening includes a first edge which is parallel to an initial alignment direction of the liquid crystal molecules when no voltage is applied thereto and a second edge which is vertical to the initial alignment direction.

11. The liquid crystal device of claim 9, wherein the first opening, the second opening, and the third opening are formed in the same shape.

12. The liquid crystal device of claim 11, wherein the first opening, the second opening, and the third opening are formed in the same direction.

13. The liquid crystal device of claim 9, wherein each of the first electrode and the second electrode is a transparent conductive layer.

14. The liquid crystal device of claim 13, wherein the first substrate further includes a reflective layer.

15. The liquid crystal device of claim 9, wherein the first electrode is a reflective layer and the second electrode is a transparent conductive layer.

* * * * *